(12) United States Patent
Bay et al.

(10) Patent No.: US 11,626,112 B1
(45) Date of Patent: Apr. 11, 2023

(54) BIAS DETECTION IN SPEECH RECOGNITION MODELS

(71) Applicant: Wells Fargo Bank, N.A., San Francisco, CA (US)

(72) Inventors: Yong Yi Bay, Normal, IL (US); Menglin Cao, Danville, CA (US); Yang Yang, Mountain View, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 202 days.

(21) Appl. No.: 17/168,711

(22) Filed: Feb. 5, 2021

(51) Int. Cl.
*G10L 15/22* (2006.01)
*G10L 15/26* (2006.01)
*G10L 15/07* (2013.01)

(52) U.S. Cl.
CPC ............ *G10L 15/22* (2013.01); *G10L 15/075* (2013.01); *G10L 15/26* (2013.01); *G10L 2015/226* (2013.01)

(58) Field of Classification Search
CPC ....... G10L 15/22; G10L 15/26; G10L 15/075; G10L 2015/226
USPC ......................................................... 704/270
See application file for complete search history.

(56) References Cited

U.S. PATENT DOCUMENTS

| | | | |
|---|---|---|---|
| 9,569,593 B2 * | 2/2017 | Casella dos Santos | G16H 15/00 |
| 9,569,594 B2 * | 2/2017 | Casella dos Santos | G16Z 99/00 |
| 10,885,903 B1 * | 1/2021 | Siddall | G10L 15/1815 |
| 2014/0058731 A1 | 2/2014 | Tyagi et al. | |
| 2015/0127349 A1 | 5/2015 | Agiomyrgiannaskis | |
| 2019/0392818 A1 | 12/2019 | Lee | |
| 2020/0117582 A1 | 4/2020 | Srivastava et al. | |
| 2020/0280825 A1 | 9/2020 | Ronnau | |
| 2020/0312311 A1 | 10/2020 | Bodenstab et al. | |
| 2020/0357392 A1 | 11/2020 | Zhou et al. | |

FOREIGN PATENT DOCUMENTS

IN 201741023991 A 7/2017

OTHER PUBLICATIONS

Wang, et al., Exploring End-to-End Multi-Channel ASR with Bias Information for Meeting Transcription, arXiv:2011, Nov. 5, 2020, 8 pages.

Shi, et al., "A Measure of Phonetic Similarity to Quantify Pronunciation Variation by Using ASR Technology,", 18th International Congress of Phonetic Sciences (ICPhS 2015), 5 pages.

Koenecke, et al., Racial disparities in automated speech recognition, PNAS first published Mar. 23, 2020, https://doi.org/10.1073/pnas.1915768117, 6 pages.

(Continued)

*Primary Examiner* — Susan I McFadden
(74) *Attorney, Agent, or Firm* — Merchant & Gould P.C.

(57) ABSTRACT

Systems and methods for detecting demographic bias in automatic speech recognition (ASR) systems. Corpuses of transcriptions from different demographic groups are analyzed, where one of the groups is known to be susceptible to bias and another group is known not to be susceptible to bias. ASR accuracy for each group is measured and compared to each other using both statistics-based and practicality-based methodologies to determine whether a given ASR system or model exhibits a meaningful level of bias.

19 Claims, 3 Drawing Sheets

(56) References Cited

OTHER PUBLICATIONS

R. Tatman, C. Kasten, Effects of Talker Dialect, Gender & Race on Accuracy of Bing Speech and YouTube Automatic Captions. Proc. Interspeech 2017, 934-938, https://doi.org/10.21437/lnterspeech.2017-1746, 5 pages.

D. Harwell, Washington Post, 2020, https://www.washingtonpost.com/graphics/2018/business/alexa-does-not-understand-your-accent/, retrieved Aug. 12, 2020, 15 pages.

"Word Error Rate." https://en.wikipedia.org/wiki/Word_error_rate, retrieved Aug. 12, 2020, 4 pages.

Gajane P. and Pechenizkiy M. (2017). On Formalizing Fairness in Prediction with Machine Learning, https://arxiv.org/abs/1710 03184, retrieved Aug. 12, 2020, 6 pages.

Elliot Ko, J.D, Big Enough to Matter: Whether Statistical Significance or Practical Significance Should Be the Test for Title VII Disparate Impact Claims, , Minnesota Law Review, https://www.minnesotalawreview.org/wp-content/uploads/2016/12/Ko.pdf, retrieved Aug. 25, 2020, 38 pages.

P. K. Lohia, K. Natesan Ramamurthy, M. Bhide, D. Saha, K. R. Varshney and R. Puri (2019), Bias Mitigation Post-processing for Individual and Group Fairness, IEEE International Conference on Acoustics, https://krvarshney.github.io/pubs/LohiaRBSVP_icassp2019.pdf, doi:10.1109/ICA, retrieved Jan. 29, 2021.

Shrestha, Y Yang (2019). Fairness in algorithmic decision-making: Applications in multi-winner voting, machine learning, and recommender systems, Algorithms, https://www.mdpi.com/1999-4893/12/9/199, retrieved Aug. 25, 2020, 28 pages.

M. Feldman, S. Friedler, J. Moeller, C. Scheidegger, S. Venkatasubramanian (2014). Certifying and Removing Disparate Impact, arXiv. https://arxiv.org/pdf/1412.3756, retrieved Aug. 25, 2020, 28 pages.

Levit, M., et al., "Don't Count on ASR to Transcribe for You: Breaking Bias with Two Crowds," Interspeech 2017, Aug. 20-24, 2017, Stockholm, Sweeden, 5 pages.

\* cited by examiner

BIAS DETECTION IN SPEECH RECOGNITION MODELS

BACKGROUND

Automatic speech recognition (ASR) is becoming ever more popular across a number of industries and, particularly, in the customer service sector. ASR technology typically utilizes an ASR model that converts digitalized acoustic waves of a person's naturally uttered speech into text using transcription algorithms and natural language algorithms that identify phonemes and match them with words or word segments stored in libraries or lexicons to generate textual representations of the speech. A response to the speaker can be generated based on the understanding.

Various demographic characteristics of a speaker can impact the ability of the ASR model to perform accurately and understand the speaker's speech. For example, a speaker's gender, ethnicity, or upbringing as a native language speaker or non-native language speaker can impact automatic speech recognition for that speaker. If the demographic is viewed as suspect or quasi-suspect due to present or historical prejudice against that demographic (e.g., a demographic based on race, national origin, religion, alienage, gender, etc.), then ASR models that underperform for speakers of that demographic, as compared with non-suspect demographics can reflect an unfair bias by the ASR model against the suspect or quasi-suspect demographic.

SUMMARY

Embodiments of the present disclosure are directed to systems and methods that determine whether an ASR model is meaningfully biased against a demographic that is predetermined to be susceptible to bias. For example, a demographic is susceptible to bias if the demographic is considered a suspect or quasi-suspect class due to present or historical prejudice against that class. Non-limiting examples of such classes include certain races, national origins, religions, alienages, genders, etc. Demographics can be predetermined to be susceptible to bias for other reasons. In various examples, determination and/or detection of an unfair bias in an ASR model is an integral step in correcting and remediating the unfair bias in the ASR model. Accordingly, various examples described herein help promote inclusion and equality, and help improve ASR model performance for all speakers.

In one aspect, a system includes one or more processors; and non-transitory computer-readable storage media encoding instructions which, when executed by the one or more processors, causes the system to: compare, for each of a first group and a second group, each of a plurality of transcribed textual representations of a plurality of digitalized utterances to a text of one or more words of a corresponding acoustic utterance to determine, for each group, a transcription accuracy, the transcription accuracy for each group being based on one or more textual representations not matching one or more texts of corresponding acoustic utterances; measure a difference between the transcription accuracy for the first group and the transcription accuracy for the second group; and determine that the difference corresponds to a level of bias as between the first group and the second group, the level of bias being one of existent bias, non-existent bias, or inconclusive bias, the determine including to: (i) calculate whether there is a statistical significance of the difference; and (ii) calculate whether there is a practical significance of the difference, the practical significance being based on a ratio of the transcription accuracy for the first group and the transcription accuracy for the second group.

In another aspect, a computer-implemented method includes: transcribing, using an automated speech recognition (ASR) model, each digitalized utterance of a plurality of digitalized utterances into a corresponding textual representation of the digitalized utterance, each digitalized utterance corresponding to one of a plurality of acoustic utterances, each of the acoustic utterances being provided by one of a first group of users and a second group of users and received by an audio input device, each of the acoustic utterances corresponding to a text of one or more words; comparing each textual representation to the text of the corresponding acoustic utterance to determine, for each group, a transcription accuracy, the transcription accuracy for each group being based on one or more of the textual representations not matching one or more of the texts of the corresponding acoustic utterances; measuring a difference between the transcription accuracy for the first group and the transcription accuracy for the second group; and determining that the difference corresponds to a level of bias as between the first group and the second group, the level of bias being one of existent bias, non-existent bias, or inconclusive bias, the determining including: (i) calculating whether there is a statistical significance of the measured difference; and (ii) calculating whether there is a practical significance of the measured difference, the practical significance being based on a ratio of the transcription accuracy for the first group and the transcription accuracy for the second group.

In another aspect, a system includes: one or more processors; and non-transitory computer-readable storage media encoding instructions which, when executed by the one or more processors, causes the system to: transcribe, using an automated speech recognition (ASR) model, each digitalized utterance of a plurality of digitalized utterances into a corresponding textual representation of the digitalized utterance, each digitalized utterance corresponding to one of a plurality of acoustic utterances, each of the acoustic utterances being provided by one of a first group of users and a second group of users and received by an audio input device, each of the acoustic utterances corresponding to a text of one or more words; compare each textual representation to the text of the corresponding acoustic utterance to determine, for each group, a transcription accuracy, the transcription accuracy for each group being based on one or more of the textual representations not matching one or more of the texts of the corresponding acoustic utterances; measure a difference between the transcription accuracy for the first group and the transcription accuracy for the second group; determine that the difference corresponds to a level of bias as between the first group and the second group, the level of bias being one of existent bias, non-existent bias, or inconclusive bias, the determine including to: (i) calculate whether there is a statistical significance of the measured difference based on a variance relative to a mean transcription accuracy for each of the first group and the second group and/or based on a median transcription accuracy for each of the first group and the second group; and (ii) calculate whether there is a practical significance of the measured difference, the practical significance being based on a ratio of the transcription accuracy for the first group and the transcription accuracy for the second group; and generate an alert, in response to a determined existent bias, the alert including a recommendation to adjust the ASR model to address the existent bias, wherein each of the first group and the second group corresponds to different ones of a plurality of demographics of people; and wherein one of the demographics is predetermined to be susceptible to the bias and the other of the demographics is predetermined to be not susceptible to the bias.

The details of one or more techniques are set forth in the accompanying drawings and the description below. Other features, objects, and advantages of these techniques will be apparent from the description, drawings, and claims.

DETAILED DESCRIPTION

The present disclosure is directed to detecting bias in ASR models and alerting users to the existence of bias. According to certain examples, embodiments of the present disclosure are also configured to generate remedial action recommendations for addressing bias. Embodiments of the present disclosure can also determine whether an ASR model is biased against a demographic that is predetermined to be susceptible to bias.

Determining whether text transcriptions performed by an ASR system using a given ASR model are biased against one or more demographics susceptible to bias can be difficult. For example, transcription data for that model may indicate bias on a purely statistical level. However, a statistical conclusion of bias may not reflect bias that rises to a level that actually warrants remedial action based on legal, regulatory, policy, or other requirements or considerations. Herein, bias warranting remedial or corrective action to an ASR model by an institution or enterprise that uses the ASR model is referred to as "meaningful bias".

Advantageously, systems and methods of the present disclosure are configured to detect whether a given ASR model exhibits meaningful bias using a combination of statistics-based and practicality-based metrics and algorithms.

Further advantageously, systems and methods of the present disclosure are configured to automatically provide alerts when meaningful bias is detected for a given ASR model, and/or to automatically provide remedial recommendations for addressing meaningful bias that has been detected.

Further advantageously, systems and methods of the present disclosure are configured to detect meaningful bias of an industry- or enterprise-specific ASR model. For example, transcription accuracy based on common words or phrases spoken by a customer or potential customer of a given type of business enterprise (e.g., a financial services enterprise, a medical services enterprise, a transportation services enterprise, a hospitality services enterprise, a leisure services enterprise, other consumer services enterprises) are used to determine whether meaningful bias exists in the ASR model. For example, words and phrases can be predetermined based on a probability that exceeds a threshold probability that the words or phrases are uttered by a customer or potential customer during a voice communication between the customer or potential customer and the institution or enterprise.

By detecting meaningful bias, ASR models can be improved to reduce and, eventually, illuminate bias in ASR models. Thus, embodiments of the present disclosure are directed to improvements in ASR technology by identifying inherent bias in existing ASR models. These improvements in ASR models and the underlying computing devices are reflected in practical applications. For example, ASR models are used to interact with customers and potential customers. The ASR model improvements described herein improve those interactions by changing how the ASR model understands the customer or potential customer, which in turn can result in a change in the content of a synthesized response to the customer or potential customer. For instance, instead of performing an action on behalf of the customer or potential customer that was not requested due to a misunderstanding of their speech, or instead of asking the customer or potential customer to repeat themselves, an appropriate synthesized response is generated and/or an appropriate action is performed following the customer or potential customer's request because that request has been correctly understood by an improved ASR model according to the present disclosure.

Figure 1:
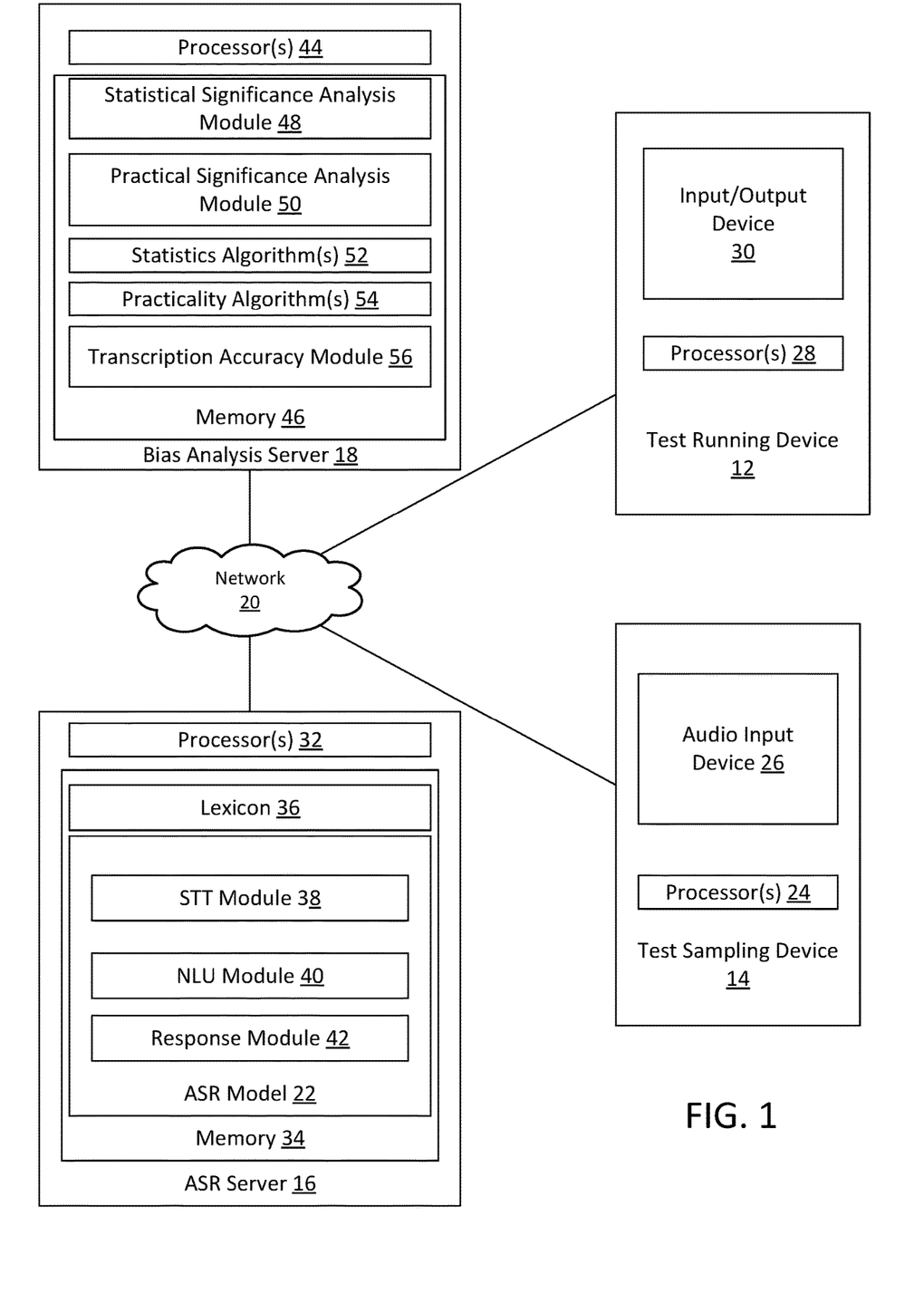
FIG. 1 schematically shows components of an example system according to the present disclosure.

FIG. 1 schematically shows components of an example system 10 according to the present disclosure. The system 10 includes a test running device 12, a test sampling device 14, an ASR server 16, and a bias analysis server 18.

The test running device 12 is a computing device, such as a laptop computer, a desktop computer, a tablet computer, a smartphone, etc. Likewise, the test sampling device 14 is a computing device, such as a laptop computer, a desktop computer, a tablet computer, a smartphone, etc. See, e.g., FIG. 3.

In the example shown, the test running device 12 and the test sampling device 14 are physically distinct devices. In alternative examples, the functionalities of the test running device and the test sampling device can be performed by a single computing device.

The ASR server 16 is a computing device configured to perform automatic speech recognition. The ASR server 16 can be associated with a given business enterprise, such as a financial services institution. The ASR server 16 can be configured to be accessed only by the business enterprise or institution to which it is associated. Alternatively, the server 16 can correspond to shared computing resources, such as a cloud, to which a given business enterprise or institution can gain access for their private computing needs.

The bias analysis server 18 is a computing device configured to perform bias analysis of the ASR model 22 stored on the ASR server 16. The bias analysis server 18 can be associated with a given business enterprise or institution, such as a financial services institution. The bias analysis server 18 can be associated, exclusively or non-exclusively, with the same business enterprise as the ASR server 16. The bias analysis server 18 can be configured to be accessed only by the business enterprise to which it is associated. Alternatively, the server 18 can correspond to shared computing resources, such as a cloud, to which a given business enterprise can access for their private computing needs.

In the example shown, the ASR server 16 and the bias analysis server 18 are physically distinct servers. In alternative examples, the functionalities of these servers can be performed by a single server.

The bias analysis server 18, the ASR server 16, the test running device 12, and the test sampling device 14 are interconnected via a network 20. The network 20 can be any suitable data network, such as the internet, a wide area network, a local area network, a wired network, a wireless network, a cellular network, a satellite network, a near field communication network, or any operatively connected combination of these.

The test sampling device 14 includes one or more processor(s) 24 and an audio input device 26. The processor(s) 24 can execute computer readable instructions for performing functions of the test sampling device 14, such as digitalizing user speech captured by the audio input device 26, and transmitting the digitalized speech via the network 20.

The audio input device 26 can be any suitable piece of hardware for capturing spoken utterances such that they can be converted into digitalized signals. For example, the audio input device 26 can include a microphone.

The test sampling device 14 is used to collect speech samples from different groups or demographics of people to determine if the ASR model 22 is biased against one of the groups and, particularly, to determine if the ASR model 22 is meaningfully biased against a group that is susceptible to bias.

It should be appreciated that there can be multiple test sampling devices. For example, each participant in an ASR model bias test (also referred to herein as a study) can use their own personal test sampling device to provide speech samples.

The participants can be knowing participants in an ASR model bias study. In these examples, a participant's group or corpus can be selected based by a self-identification process. For example, each participant can self-identify with respect to every variable being tested for bias. For example, each participant can self-identify whether they are male or female, a native language speaking or non-native language speaker, and so forth. The self-identification can be provided by an utterance captured by the audio input device 26 and recorded by the ASR server 16 and/or the bias analysis server 18.

Alternatively, the participants can be unknowing participants in the study. For example, the speech samples can be collected from actual customer or potential customer voice interactions with a given enterprise via the audio input device 26 and using the ASR model 22. In such examples, grouping of each customer or potential customer based on the variable or variables being tested for bias can be achieved by any suitable means. For example, an existing customer may already have a personal profile or an account profile that contains demographic data (e.g., male/female data) indicative of the appropriate test group or control group in which to place the participant. In another example, an electronic screen scraping tool can locate and extract publicly available demographic information (e.g., from public facing social media profiles and posts) based on the customer or potential customer's name or other identifying information.

For participants that know they are involved in an ASR bias study, each participant can be given the same script to recite into the audio input device of their respective test sampling device. The script can include one or more predetermined words or phrases. The predetermined words or phrases can be selected based on the type of enterprise or institution and common words or phrases used by customers or potential customers when interacting with that institution.

The test running device 12 includes one or more processors 28 and an input/output (I/O) device 30. The processor(s) 28 can execute computer readable instructions for performing functions of the test running device 12, such as processing data received at the test running device 12 via the network 20 and providing information, alerts, prompts, and so forth, using the I/O device 30, as well as transmitting command signals provided by a user via the I/O device 30 for running ASR model bias tests.

The I/O device 30 can include an interactive graphical display (e.g., a touch display), a keyboard, a mouse, a stylus, a microphone, a speaker, and so forth. The I/O device can be used to receive commands from a user (e.g., a stakeholder of a given enterprise or institution) to run a bias detection test for the ASR model 22 with respect to one or more demographics. Results of a bias detection test can then be provided to the stakeholder via the I/O device 30. In addition, if meaningful bias is detected, an alert can be generated using the I/O device 30. Such an alert can include an audio and/or a visual alert using, e.g., a graphical display, a speaker, etc. In addition, if meaningful bias is detected, one or more suggested or recommended remedial actions for improving the ASR model 22 and reducing or eliminating the detected meaningful bias can be provided using the I/O device 30.

The ASR server 16 includes one or more processors 32. The processor(s) 32 can execute computer readable instructions for performing functions of the ASR server 16.

The ASR server 16 includes a memory 34. The memory 34 stores data and computer readable instructions executable by the processor(s) 32. The memory 34 stores a lexicon 36 and the ASR model 22. The lexicon 36 can be used as a resource for the ASR model 22 to match captured speech provided via the audio input device 26 with text corresponding to the speech. Thus, for example, the lexicon 36 can include a bank of common words, common phrases, and so forth. The commonness of the stored words or phrases can be specific to the enterprise or institution. For example, for a financial institution, the lexicon 36 can store words and phrases common to customer interactions with a financial institution, such as words and phrases pertaining to checking accounts, savings accounts, credit cards, investments, portfolios, mortgages, etc.

The ASR model 22 includes a speech to text (STT) module 38, a natural language understanding (NLU) module 40, and a response module 42.

The STT module 38 is configured to convert digital signals corresponding to the participants' natural acoustic utterances into a text string using one or more STT algorithms and/or algorithms that employ machine learning. In some examples, the STT module 38 generates multiple possible text strings for a given natural acoustic utterance.

The NLU module 40 is configured to process the text string outputs from the STT module and convert them into understood textual representations of the natural acoustic utterances. For example, the NLU module can parse a text string output from the STT module 38 into one or more intent models having one or more key:value pairs and assign confidence scores to the different intent models based using the lexicon 36 and/or one or more NLU algorithms and/or algorithms that employ machine learning. For example, the NLU module can parse a text string into an intent model having an intent of "open account" and a key:value pair of account type:checking. Based on relative confidence scores, the NLU module 40 is configured to select an intent model and output the understood textual representation of the natural acoustic utterance.

The response module 42 is configured to generate a response to the natural acoustic utterance based on the understood textual representation of the utterance output by the NLU module. The response module 42 is configured to formulate an appropriate response using the lexicon 36 and/or one or more response algorithms and/or algorithms that employ machine learning. For example, in response to an output from the NLU module 40 of "I want to open a checking account", the response module 42 generates a response of, "I understand you want to open a checking account. Is that correct?" The response module 42 can present the response via an output device of the test sampling device 14. For example, the response module 42 uses a text to speech module to convert the selected response into audio signals that can be audibly provided to the customer or potential customer via a speaker output device of the test sampling device.

The bias analysis server 18 includes one or more processors 44. The processor(s) 44 can execute computer readable instructions for performing functions of the bias analysis server 18.

The bias analysis server 18 includes a memory 46. The memory 46 stores data and computer readable instructions executable by the processor(s) 44.

The memory 46 stores a transcription accuracy (TA) module 56, a statistical significance analysis (SSA) module, a practical significance analysis (PSA) module, one or more statistics algorithms 52 that can be used by the SSA module 48, and one or more practicality algorithm(s) 54 that can be used by the PSA module 50.

In some examples, one or more of the statistics algorithms 52 are algorithms that employ machine learning. In some examples, one or more of the practicality algorithms 54 are algorithms that employ machine learning.

The bias analysis server 18 receives a request from the test running device 12 to determine whether the ASR model 22 exhibits meaningful bias with respect to a selected demographic that is susceptible to bias.

The selected demographic is selected by a user (e.g., an institution stakeholder) using the test running device 12.

The bias analysis server 18 obtains textual representations of natural acoustic utterances that have been generated by the NLU module 40. In some examples, these textual representations can be stored in the memory 34 and/or the memory 46. Each textual representation can be tagged with demographic data associated with the participant that uttered the corresponding natural acoustic utterance. For example, for some participants, the corresponding textual representation can be tagged to indicate that the participant is a non-native language speaker. For other participants, the corresponding textual representation can be tagged to indicate that the participant is a native language speaker.

Additional tags can be used such that participants can be sorted into groups that isolate the variable being tested. For example, a textual representation can be tagged as non-native and male to isolate a test for bias against non-native speakers from a test for bias against females. Similarly for the control group, only textual representations that have no associated demographic characteristic that is susceptible to bias (e.g., only male native speakers) are included.

The TA module 56 determines a transcription accuracy for a test group and a control group, with the test group and control group being identified by, e.g., a stakeholder using the test running device 12. For example, to test for bias against non-native language speakers, the test group can be non-native language speaker participants who do not fall under other demographic characteristics susceptible to bias, and the control group can be native language speakers who do not fall under any demographic characteristics susceptible to bias.

Transcription accuracy for each group relevant to a bias detection request can be determined in any suitable way by the TA module 56. For example, if the participants are knowing participants in a study, then, for each group, the TA module 56 can compare the textual representations provided by the ASR model 22 of the natural acoustic utterances with the text of the predetermined words and/or phrases that the participants were reciting into the audio input device 26 to arrive. The scripts of the words/and or phrases can be stored in the memory 46 and cross-referenced against the corresponding textual representations by the TA module 56 by matching each textual representation with the corresponding text from the script. This can be performed, for example, based on the sequence of captured natural acoustic utterances and the sequence of words and/or phrases in the script. A ratio can then be taken of the number of textual representations that accurately match the corresponding text to the total number of words and/or phrases being analyzed.

In some examples, e.g., in order to avoid undue weighting of outlier participants (such as participants who are almost entirely unintelligible for non-demographic reasons) in determining transcription accuracy for given ASR model, each participant is scored on a binary scale as either transcription accurate or transcription inaccurate, and the transcription accuracy of their group is determined based on the number of transcription inaccurate participants in the group and the total number of participants in the groups, e.g., as a ratio. In order for a participant to be labeled as transcription inaccurate, for example, at least a certain predefined threshold number or certain predefined threshold percentage (e.g., 20 percent) of words or phrases uttered by the participant must be incorrectly transcribed. Other example methods of determining transcription accuracy are possible.

Words and phrases can be analyzed separately. For example, a transcription accuracy with respect to individual words can be calculated separately from a transcription accuracy with respect to phrases, and one or both of the transcription accuracies can be used to determine whether there is a difference in transcription accuracy between the control and test groups.

In some examples, transcription accuracy for a given group is measured by the TA module 56 as a mean transcription accuracy across the individuals of that group. In some examples, transcription accuracy for a given group is measured by the TA module 56 as a median transcription accuracy across the individuals of that group.

If the participants are unknowing participants in a study and, therefore, their natural utterances do not correspond to a predefined script, then transcription accuracy of the ASR model 22 for each group can be determined in alternative ways. For example, an incorrect transcription can be assumed by the TA module 56 if the response module 42 generates a response to a natural utterance stating what was understood by the ASR model 22 to have been uttered, and the participant provides a negative natural utterance via the audio input device 26 and in reply to the ASR model's 22 response such as "no", indicating that the ASR model 22 had not correctly understood the prior utterance. In this example, transcription accuracy can be based on, for instance, a frequency of negative natural utterance replies by participants.

It should be appreciated that a given bias analysis can be performed using only natural utterances from knowing participants, only natural utterances from unknown participants, or a combination. In some examples, the institution stakeholder can select the type(s) of participants to be considered using the test running device 12.

For each bias analysis, the SSA module 48 compares the transcription accuracy output by the TA module 56 for the test group against the transcription accuracy output by the TA module 56 for the control group and calculates a difference between the two transcription accuracies. In addition, the SSA module 48 uses one or more of the statistics algorithms 52 to determine whether a calculated difference between the transcription accuracies is statistically significant. For purposes of describing these examples, whenever a difference between transcription accuracies is detected, that difference reflects a higher transcription accuracy for the control group than for the test group.

Statistical significance can reflect whether obtained results are likely indicative of a true effect in the overall population, rather than a product of random chance that exists solely within the test and/or control groups. For example, a test sample size or a control sample size can be too small or otherwise not representative of the overall population it is meant to represent for the results of the bias test to be statistically significant.

The statistics algorithms 52 can include one or more analysis of variance algorithms to gauge whether the difference in phrase accuracies is statistically significant, such as, but not limited to, the Shapiro-Wilk test, the Kruskal-Wallis test, Levene's test, and Bartlett's test. Analysis of variance can be applied using a one-way independent variable approach and/or a multi-way independent variable approach. Depending on the test and/or approach employed, the difference in transcription accuracy between the test and control groups can be measured. For example, the difference can be measured based on mean transcription accuracy across each group. Alternatively, the difference can be measured based on median transcription accuracy across each group. Furthermore, multiple analysis of variance tests can be applied to the same data sets as a further factor used by the SSA module 48 to determine whether statistical significance exists. For example, if the results of two applied analyses of variance algorithm tests differ by more than a threshold amount, the SSA module 48 determines that the data is not statistically significant.

It should be appreciated that the statistics algorithms 52 can include algorithms that are not based on analysis of variance to determine how normalized the distribution of data in each group is and thereby whether a difference in transcription accuracy between groups is statistically significant.

The SSA module 48 applies the one or more statistics algorithms 52 and, based thereon, outputs a result indicating whether the difference is statistically significant.

The outputs of the SSA module 48 can be provided to the test running device 12 and presented to the institution stakeholder using the test I/O device 30.

For each bias analysis, the PSA module 50 uses one or more of the practicality algorithm(s) 54 to determine whether a difference in transcription accuracy calculated by the TA module 56 is practically significant.

While statistical significance relates to whether a true effect exists, practical significance relates to the magnitude of the effect. A statistically significant result may be of an effect size so small that it is considered trivial to a given enterprise, institution or stakeholder. A statistical test does not of itself indicate whether an effect (e.g., a transcription accuracy difference between two groups with respect to an ASR model) is large enough to warrant corrective action. For example, with respect to bias, a statistical significance test, regardless of its outcome, does not of itself indicate whether the test demographic is in fact being biased against by the ASR model to an extent that would be recognized by the institution or enterprise that uses the ASR model as warranting adjustment or replacement of the ASR model.

The practicality algorithms 54, therefore, can take into account factors such as business domain knowledge and expertise, corporate or regulatory bias compliance policies, business risk management factors, and so forth.

One non-limiting example of the practicality algorithm(s) 54 is the four-fifths rule.

In one example application of the four-fifths rule, the mean transcription accuracy for the test group is divided by the mean transcription accuracy for the control group. If the quotient is less than four fifths (0.8), then the PSA module 50 outputs a result indicating that the difference in transcription accuracy between the control and test groups is practically significant. If the quotient is greater than or equal to four fifths (0.8), then the PSA module 50 outputs a result indicating that the difference in transcription accuracy between the control and test groups is practically insignificant.

In another example application of the four-fifths rule, the median transcription accuracy for the test group is divided by the median transcription accuracy for the control group. If the quotient is less than four fifths (0.8), then the PSA module 50 outputs a result indicating that the difference in transcription accuracy between the control and test groups is practically significant. If the quotient is greater than or equal to four fifths (0.8), then the PSA module 50 outputs a result indicating that the difference in transcription accuracy between the control and test groups is practically insignificant.

The outputs of the PSA module 50 can be provided to the test running device 12 and presented to the institution stakeholder using the test I/O device 30, e.g., in the form of an alert, and/or optionally, by providing suggested or recommended remedial action to modify or replace the ASR model. For example, the PSA module 50 can recommend replacing the ASR model with an existing updated ASR model. In another example, the PSA module 50 can recommend adjusting the ASR model to reduce a particular type of meaningful bias detected, such as by training machine learning aspects of the ASR model with trainers that fall into the group detected to be biased. For instance, the PSA module 50 can recommend soliciting non-native language speakers to train the ASR model to reduce detected meaningful bias against non-native language speakers.

Figure 2:
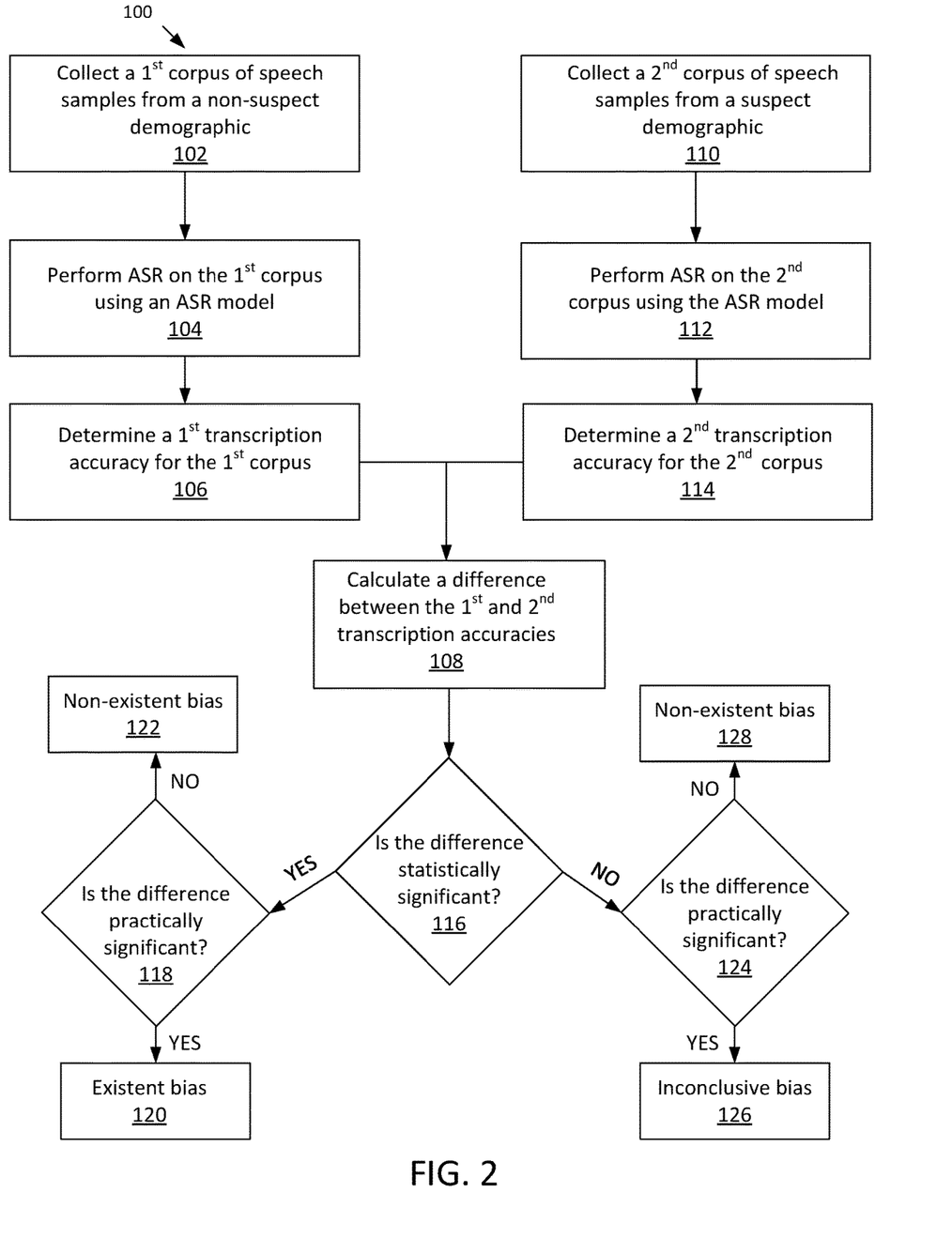
FIG. 2 is an example process flow and decision tree that can be performed using the system of FIG. 1.

FIG. 2 is an example process flow 100, including a decision tree that can be executed using the system 10 of FIG. 1.

At a step 102 of the process flow 100 a first corpus of speech samples (i.e., natural utterances) from a demographic not susceptible to bias, i.e., a control group, is collected by the ASR server 16 (FIG. 1).

At a step 110, which can occur concurrently with, prior to, or subsequent to the step 102, a second corpus of speech samples (i.e., natural utterances) from a demographic susceptible to bias, i.e., a test group, is collected by the ASR server 16 (FIG. 1).

At a step 104, ASR is performed by the ASR model 22 (FIG. 1) on the first corpus of speech samples.

At a step 112, which can occur concurrently with, prior to, or subsequent to the step 104, ASR is performed by the ASR model 22 (FIG. 1) on the second corpus of speech samples.

At a step 106, a transcription accuracy for the first corpus of speech samples is determined by the TA module 56 (FIG. 1).

At a step 114, which can occur concurrently with, prior to, or subsequent to the step 106, a transcription accuracy for the second corpus of speech samples is determined by the TA module 56 (FIG. 1).

At a step 108, the transcription accuracy outputs from the steps 106 and 114 are processed by the TA module 56 (FIG. 1) to determine and quantify a difference between the transcription accuracies.

Optionally, if no difference is detected at the step 108 or if the transcription accuracy for the test corpus exceeds that of the control corpus, the process can terminate.

At a step 116, the SSA module 48 (FIG. 1) determines whether the determined difference is statistically significant.

If a statistical significance is determined at the step 116, then at the step 118 the PSA module 50 (FIG. 1) determines whether the determined difference is practically significant.

If a practical significance is determined at the step 118, then at the step 120 the bias analysis server 18 (FIG. 1) determines that meaningful bias by the ASR model 22 (FIG. 1) exists with respect to the test group and the result is reported at the test running device 12 (FIG. 1).

If practical significance is not determined at the step 118, then at the step 122 the bias analysis server 18 (FIG. 1) determines that meaningful bias by the ASR model 22 (FIG. 1) does not exist with respect to the test group and the result is reported at the test running device 12 (FIG. 1).

If a statistical significance is not determined at the step 116, then at the step 124 the PSA module 50 (FIG. 1) determines whether the determined difference is practically significant. Alternatively, the result of no statistical significance is reported at the test running device 12 and the process can terminate.

If a practical significance is determined at the step 124, then at the step 126 the bias analysis server 18 (FIG. 1) determines that it is inconclusive whether meaningful bias by the ASR model 22 (FIG. 1) exists with respect to the test group and the result is reported at the test running device 12 (FIG. 1). In this scenario, that there is found to be practical significance is inconclusive due to the determined statistical shortfall of the study.

If practical significance is not determined at the step 124, then at the step 128 the bias analysis server 18 (FIG. 1) determines that meaningful bias by the ASR model 22 (FIG. 1) does not exist with respect to the test group and the result is reported at the test running device 12 (FIG. 1). Alternatively, due to the lack of statistical significance, if practical significance is not determined at the step 124, then at the step 128 the bias analysis server 18 (FIG. 1) determines that meaningful bias by the ASR model 22 (FIG. 1) is inconclusive with respect to the test group and the result is reported at the test running device 12 (FIG. 1).

Figure 3:
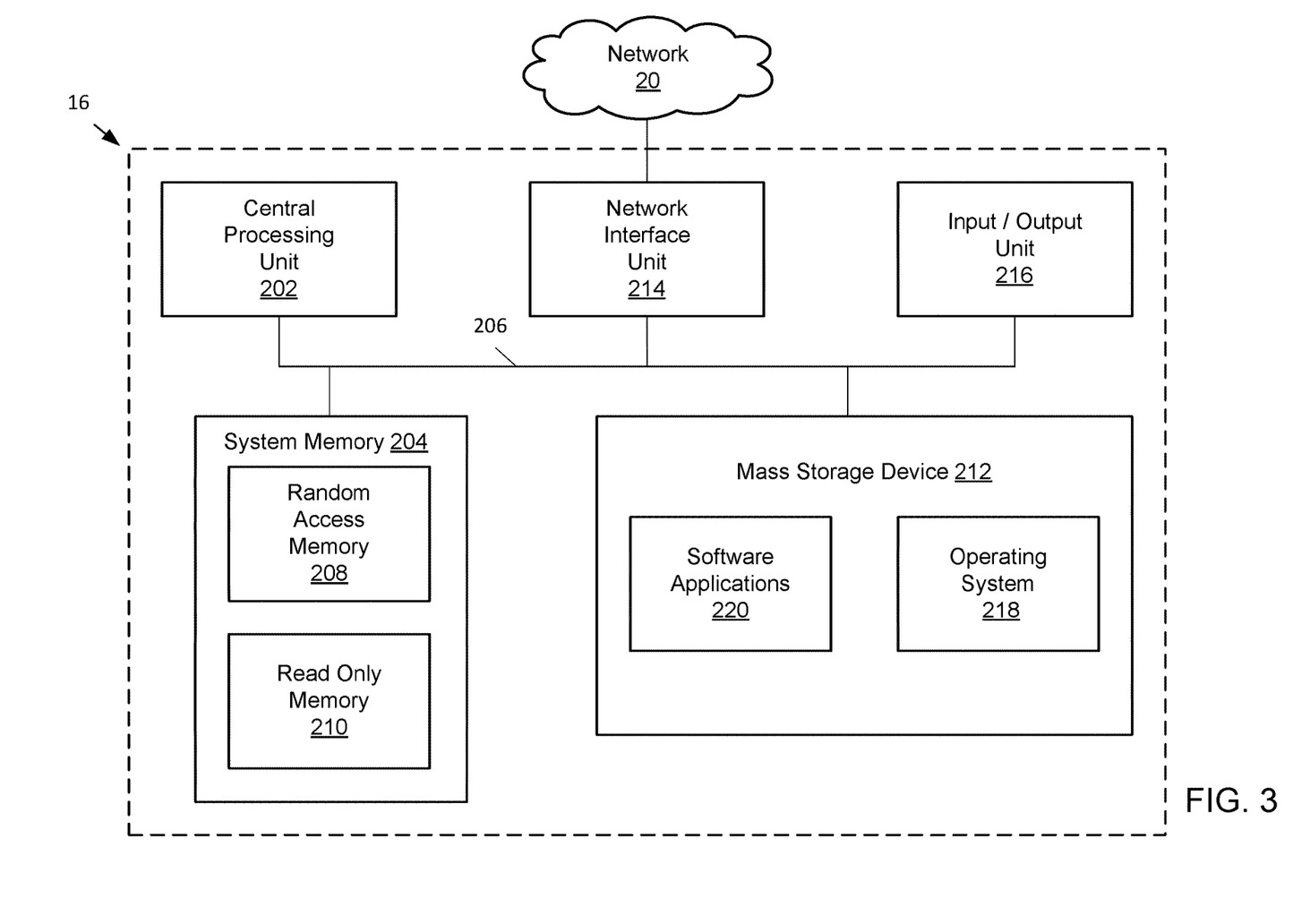
FIG. 3 schematically shows example computing components of portions of the system of FIG. 1.

Additional components of the ASR server 16 are illustrated in FIG. 3. In this example, the ASR server 16 provides the computing resources to perform the functionality associated with the system 10 (FIG. 1). The ASR server 16 can be an internally controlled and managed device (or multiple devices) of the institution or enterprise.

Alternatively, the ASR server 16 can represent one or more devices operating in a shared computing system external to the institution or institution, such as a cloud. Further, the other computing devices disclosed herein can include the same or similar components, including the test running device 12, the test sampling device 14, and the bias analysis server 18.

Via the network 20, the components of the ASR server 16 that are physically remote from one another can interact with one another.

The ASR server 16 includes at least one central processing unit ("CPU") 202, a system memory 204, and a system bus 206 that couples the system memory 204 to the CPU 202.

The CPU 202 can correspond to one or more of the processors 32, 44 of the system 10 (FIG. 1).

The system memory 204 includes a random access memory ("RAM") 210 and a read-only memory ("ROM") 212. A basic input/output system that contains the basic routines that help to transfer information between elements within the ASR server 16, such as during startup, is stored in the ROM 210.

The ASR server 16 further includes a mass storage device 212. The mass storage device 212 can correspond to one or more of the memories 34, 46 of the system 10 (FIG. 1). The mass storage device 212 is able to store software instructions and data, such as the algorithms 52 and 54, and software instructions and data required to run the ASR model 22, the SSA module 48, the PSA module 50, and the TA module 56 of the system 10 (FIG. 1).

The mass storage device 212 is connected to the CPU 202 through a mass storage controller (not shown) connected to the system bus 206. The mass storage device 212 and its associated computer-readable data storage media provide non-volatile, non-transitory storage for the ASR server 16. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the ASR server 16.

According to various embodiments of the invention, the ASR server 16 may operate in a networked environment using logical connections to remote network devices through the network 20, such as a wireless network, the Internet, or another type of network. The ASR server 16 may connect to the network 20 through a network interface unit 214 connected to the system bus 206. It should be appreciated that the network interface unit 214 may also be utilized to connect to other types of networks and remote computing systems. The ASR server 16 also includes an input/output unit 216 for receiving and processing input from a number of other devices, including a touch user interface display screen, an audio input device (such as the audio input device 26 of FIG. 1) or another type of input device. Similarly, the input/output unit 216 may provide output to a touch user interface display screen or other type of output device, including, for example, the I/O device 30 (FIG. 1).

As mentioned briefly above, the mass storage device 212 and/or the RAM 208 of the ASR server 16 can store software instructions and data. The software instructions include an operating system 218 suitable for controlling the operation of the ASR server 16. The mass storage device 212 and/or the RAM 208 also store software instructions and applications 220, that when executed by the CPU 202, cause the ASR server 16 to provide the functionality of the servers 16 and 18 (FIG. 1) described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:
one or more processors; and
non-transitory computer-readable storage media encoding instructions which, when executed by the one or more processors, causes the system to:
compare, for each of a first group and a second group, each of a plurality of transcribed textual representations of a plurality of digitalized utterances to a text of one or more words of a corresponding acoustic utterance to determine, for each group, a transcription accuracy, the transcription accuracy for each group being based on one or more textual representations not matching one or more texts of corresponding acoustic utterances;
measure a difference between the transcription accuracy for the first group and the transcription accuracy for the second group;
determine that the difference corresponds to a level of bias as between the first group and the second group, the level of bias being one of existent bias, non-existent bias, or inconclusive bias, the determine including to:
(i) calculate whether there is a statistical significance of the difference;
and
(ii) calculate whether there is a practical significance of the difference, the practical significance being based on a ratio of the transcription accuracy for the first group and the transcription accuracy for the second group; and
generate an alert, in response to a determined existent bias, the alert including a recommendation to adjust an automatic speech recognition (ASR) model to address the existent bias.

2. The system of claim 1, wherein the existent bias is determined only when both the statistical significance and the practical significance are detected.

3. The system of claim 1, wherein the non-existent bias is determined only when the practical significance is not detected.

4. The system of claim 1, wherein the non-existent bias is determined only when the statistical significance is detected and the practical significance is not detected.

5. The system of claim 1,
wherein the instructions, when executed by the one or more processors, further cause the system to:
transcribe, using the ASR model prior to the compare, each digitalized utterance into the corresponding textual representation of the digitalized utterance,
wherein each digitalized utterance is received by an audio input device.

6. The system of claim 1, wherein each transcription accuracy is based on at least one of:
a number of discrete words incorrectly transcribed; and
a number of phrases incorrectly transcribed, each of the number of phrases including a discrete sequence of words.

7. The system of claim 1,
wherein the one or more words include discrete sequences of words;
wherein the discrete sequences of words are predetermined; and
wherein the discrete sequences of words are selected based on a probability that the discrete sequences of words are uttered by a user during a voice communication between the user and an institution having a predefined type.

8. The system of claim 7, wherein the probability is greater than or equal to a predefined threshold probability.

9. The system of claim 8, wherein the predefined type is financial.

10. The system of claim 1, wherein the statistical significance is calculated based on a variance relative to a mean transcription accuracy for each of the first group and the second group.

11. The system of claim 1, wherein the statistical significance is calculated based on a variance relative to a median transcription accuracy for each of the first group and the second group.

12. The system of claim 1, wherein the practical significance is calculated by determining whether the ratio is less than, equal to, or greater than a predefined threshold ratio.

13. The system of claim 1,
wherein each of the first group and the second group corresponds to different ones of a plurality of demographics of people; and
wherein one of the plurality of demographics of people is predetermined to be susceptible to the bias and another of the plurality of demographics of people is predetermined to be not susceptible to the bias.

14. A computer-implemented method, comprising:
transcribing, using an automated speech recognition (ASR) model, each digitalized utterance of a plurality of digitalized utterances into a corresponding textual representation of the digitalized utterance, each digitalized utterance corresponding to one of a plurality of acoustic utterances, each of the plurality of acoustic utterances being provided by one of a first group and a second group and received by an audio input device, each of the plurality of acoustic utterances corresponding to a text of one or more words;
comparing each textual representation to the text of a corresponding acoustic utterance to determine, for each group, a transcription accuracy, the transcription accuracy for each group being based on one or more textual representations not matching one or more of texts of corresponding acoustic utterances;
measuring a difference between the transcription accuracy for the first group and the transcription accuracy for the second group; and
determining that the difference corresponds to a level of bias as between the first group and the second group, the level of bias being one of existent bias, non-existent bias, or inconclusive bias, the determining including:
(i) calculating whether there is a statistical significance of the difference; and
(ii) calculating whether there is a practical significance of the difference, the practical significance being based on a ratio of the transcription accuracy for the first group and the transcription accuracy for the second group; and
generating an alert, in response to a determined existent bias, the alert including a recommendation to adjust the ASR model to address the existent bias.

15. The method of claim 14,
wherein each of the first group and the second group corresponds to different ones of a plurality of demographics of people; and
wherein one of the plurality of demographics of people is predetermined to be susceptible to the bias and another of the plurality of demographics of people is predetermined to be not susceptible to the bias.

16. The method of claim 14, wherein the statistical significance is calculated based on a variance relative to a mean transcription accuracy for each of the first group and the second group.

17. The method of claim 14, wherein the statistical significance is calculated based on a variance relative to a median transcription accuracy for each of the first group and the second group.

18. The method of claim 14, wherein the practical significance is calculated by determining whether the ratio is less than, equal to, or greater than a predefined threshold ratio.

19. A system, comprising:
one or more processors; and
non-transitory computer-readable storage media encoding instructions which, when executed by the one or more processors, causes the system to:
transcribe, using an automated speech recognition (ASR) model, each digitalized utterance of a plurality of digitalized utterances into a corresponding textual representation of the digitalized utterance, each digitalized utterance corresponding to one of a plurality of acoustic utterances, each of the plurality of acoustic utterances being provided by one of a first group and a second group and received by an audio input device, each of the plurality of acoustic utterances corresponding to a text of one or more words;
compare each textual representation to the text of a corresponding acoustic utterance to determine, for each group, a transcription accuracy, the transcription accuracy for each group being based on one or more textual representations not matching one or more texts of corresponding acoustic utterances;
measure a difference between the transcription accuracy for the first group and the transcription accuracy for the second group;
determine that the difference corresponds to a level of bias as between the first group and the second group, the level of bias being one of existent bias, non-existent bias, or inconclusive bias, the determine including to:
(i) calculate whether there is a statistical significance of the difference based on a variance relative to a mean transcription accuracy for each of the first group and the second group and/or based on a median transcription accuracy for each of the first group and the second group; and
(ii) calculate whether there is a practical significance of the difference, the practical significance being based on a ratio of the transcription accuracy for the first group and the transcription accuracy for the second group; and generate an alert, in response to a determined existent bias, the alert including a
recommendation to adjust the ASR model to address the existent bias,
wherein each of the first group and the second group corresponds to different ones of a plurality of demographics of people; and
wherein one of the plurality of demographics of people is predetermined to be susceptible to the bias and another of the plurality of demographics of people is predetermined to be not susceptible to the bias.

\* \* \* \* \*